United States Patent
Andreasson (10) Patent No.: US 12,135,847 B2
(45) Date of Patent: Nov. 5, 2024

(54) INTERACTION INTERFACE DEVICE, SYSTEM AND METHOD FOR THE SAME

(71) Applicant: FlatFrog Laboratories AB, Lund (SE)

(72) Inventor: Markus Andreasson, Lund (SE)

(73) Assignee: FlatFrog Laboratories AB, Lund (SE)

(*) Notice: Subject to any disclaimer, the term of this patent is extended or adjusted under 35 U.S.C. 154(b) by 0 days.

(21) Appl. No.: 17/756,904

(22) PCT Filed: Dec. 7, 2020

(86) PCT No.: PCT/SE2020/051172
§ 371 (c)(1),
(2) Date: Jun. 3, 2022

(87) PCT Pub. No.: WO2021/112754
PCT Pub. Date: Jun. 10, 2021

(65) Prior Publication Data
US 2023/0009306 A1    Jan. 12, 2023

(30) Foreign Application Priority Data

Dec. 6, 2019  (SE) ...................... 1930391-6

(51) Int. Cl.
*G06F 3/041* (2006.01)
*G06F 9/54* (2006.01)

(52) U.S. Cl.
CPC ............ *G06F 3/04162* (2019.05); *G06F 9/54* (2013.01)

(58) Field of Classification Search
CPC ................................ G06F 9/54; G06F 3/04162
See application file for complete search history.

(56) References Cited

U.S. PATENT DOCUMENTS

| | | |
|---|---|---|
| 2013/0307796 A1 | 11/2013 | Liu et al. |
| 2015/0334138 A1 | 11/2015 | Conklin et al. |
| 2017/0185269 A1* | 6/2017 | Anttila ................ G06F 3/04845 |
| 2017/0235537 A1 | 8/2017 | Liu et al. |
| 2018/0275836 A1 | 9/2018 | Hermans et al. |
| 2019/0065030 A1* | 2/2019 | Kang ................. G06F 3/04842 |

OTHER PUBLICATIONS

International Search Report in International Application No. PCT/SE2020/051172 dated Feb. 4, 2021 in 4 pages.

* cited by examiner

*Primary Examiner* — Kenneth B Lee, Jr.
(74) *Attorney, Agent, or Firm* — Knobbe, Martens, Olson & Bear, LLP (57) ABSTRACT

An interaction interface device for providing an interface between a touch display unit and an external device. The touch display unit comprising a display unit having a touch surface. The interaction interface device comprises a first interface between the interaction interface device and the touch display unit, the first interface being configured to: receive a first touch data from the touch display unit, wherein the first touch data corresponds to touch interactions occurring within a sub-portion of the display unit, and transmit a first video data to the touch display unit for display on the sub-portion of the display unit, a second interface between the interaction interface device and the external device, the second interface being configured to: receive the first video data from an external device, and transmit the first touch data to the external device.

12 Claims, 6 Drawing Sheets

INTERACTION INTERFACE DEVICE, SYSTEM AND METHOD FOR THE SAME

TECHNICAL FIELD

The invention relates to an interaction interface device for a touch display. More specifically, examples relate to an interaction interface device between the touch display and an external device.

BACKGROUND

Today's meetings are taking place with a large format meeting display showing a presentation, drawings, or the like to the attendees of the meeting. The meeting display may even have touch capability so that the meeting members can take notes or comment during the meeting directly on the meeting display for everyone to see.

Although the meeting display may have a touch capability, when a user connects a laptop to run a presentation, the touch capability may be unavailable for the presentation. Hence, the touch capable meeting display can only be used as a regular display during the presentation or can only handle presentations or the like when in full screen mode.

Thus, improvements to touch displays for local or remote video meetings are desirable.

SUMMARY

One aspect of the description provides an interaction interface device for providing an interface between a touch display unit and an external device, the touch display unit comprising a display having a touch surface, the interaction interface device comprising; a first interface between the interaction interface device and the touch display unit, the first interface being configured to: receive a first touch data from the touch display unit, wherein the first touch data corresponds to touch interactions occurring within a sub-portion of the display, and transmit a first video data to the touch display unit for display on the sub-portion of the display, a second interface between the interaction interface device and the external device, the second interface being configured to: receive the first video data from an external device, and transmit the first touch data to the external device.

Another aspect provides an interaction system comprising, a touch display unit, the touch display unit comprising a display unit having a touch surface, an external device, and—an interaction interface device comprising; a first interface between the interaction interface device and the touch display unit, the first interface being configured to: receive a first touch data from the touch display unit, wherein the first touch data corresponds to touch interactions occurring within a sub-portion of the display, and transmit a first video data to the touch display unit for display on the sub-portion of the display, a second interface between the interaction interface device and an external device, the second interface being configured to: receive the first video data from the external device, and transmit the first touch data to the external device.

Another aspect provides a method for providing an interface between a touch display unit and an external device, the touch display unit comprising a display having a touch surface, comprising; receiving via a first interface of an interaction interface device, a first touch data from the touch display unit, wherein the first touch data corresponds to touch interactions occurring within a sub-portion of the display, transmitting via the first interface a first video data to the touch display unit for display on the sub-portion of the display, receiving via a second interface of the interaction interface device, the first video data from an external device, and transmitting the first touch data to the external device.

BRIEF DESCRIPTION OF THE DRAWINGS

Examples of the invention will now be described, by way of examples, with reference to the accompanying schematic drawings.

DETAILED DESCRIPTION

Figure 1A:
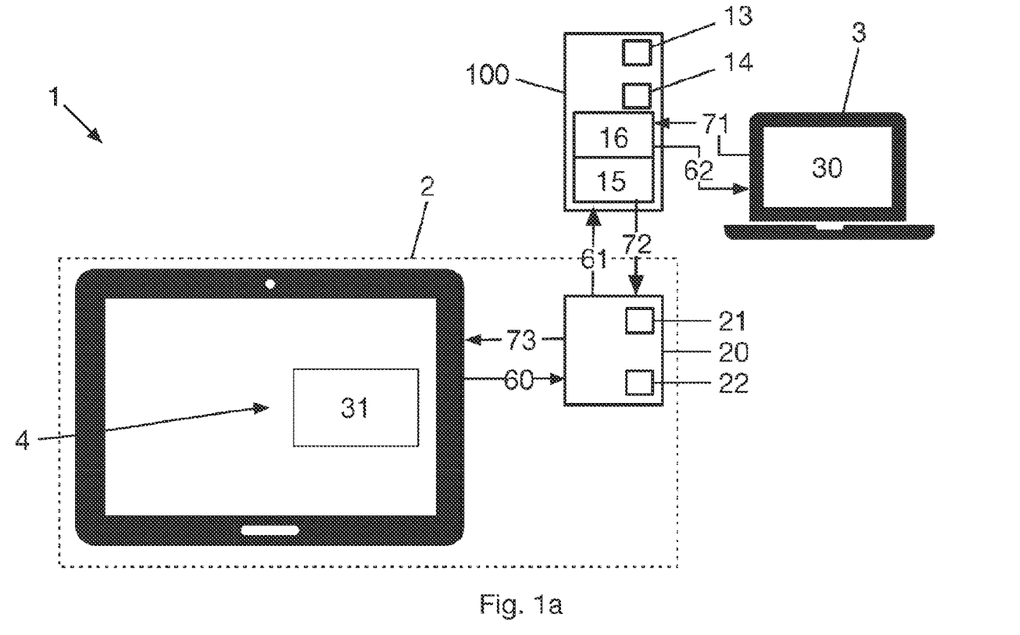
FIG. 1a is a schematic illustration of an interaction interface device for a touch display unit.

FIG. 1a is a schematic illustration of an interaction system 1 comprising an interaction interface device 100 for providing an interface between a touch display unit 2 and an external device 3. The touch display unit 2 comprises an interaction computer 20 and display 4 having a touch surface. The interaction computer 20 comprises an interaction processor 21 and an interaction memory 22. Interaction computer 20 is configured to execute a software stored in interaction memory 22 using interaction processor 21 and display an output to display 4 as first output video data 73. Interaction computer 20 is further configured to receive touch coordinate data 60 from display 4 wherein touch coordinate data 60 corresponds to touch interactions occurring on the touch surface of display 4. In one embodiment, the software is a whiteboard application 35 configured to receive and process touch coordinate data 60 to display a corresponding user interaction within a graphics user interface of the whiteboard application on display 4. The whiteboard application 35 may further comprise external display zone 31 within the graphics user interface, the external display zone 31 shown on at least a sub portion of display 4. Although described below as a 'whiteboard application', it is understood that the whiteboard application may instead be any sort of application running on touch display unit 2 with a graphics user interface.

The interaction interface device 100 comprises an interface processor 13 and an interface memory 14. The interaction interface device 100 further comprises a first interface 15 between the interaction interface device 100 and the interaction computer 20 of touch display unit 2. The first interface 15 is configured to receive a first touch data 61 from the interaction computer 20, wherein the first touch data 61 corresponds to touch coordinate data 60. The first interface 15 is also configured to transmit a first processed video data 72 to the interaction computer 20 for display in an external display zone 31.

The interaction interface device 100 further comprises a second interface 16 between the interaction interface device 100 and the external device 3. The second interface 16 is configured to receive the first video data 71 from the external device 3 and transmit the processed first touch data 62 to the external device 3.

In one example, touch coordinate data 60 are touch co-ordinates correlating directly to the position of objects interacting with display 4. First touch data 61 may be touch co-ordinates that have been filtered and or processed by interaction computer 20. Processed first touch data 62 may be touch co-ordinates that have been filtered and or processed by interaction interface device 100. In some examples, processing may comprise transcoding between the different protocols involved (e.g. convert between USB standards). In some examples, processing may comprise 2D transformations of touches related to the positioning, scaling and rotation of the external display zone 31 relative to the external display output 30, to ensure that touches within external display zone 31 are correctly applied to the corresponding position on external display zone 31. In some examples, processing may comprise gesture detection, so that particular touch interactions can be filtered and output as other types of interaction. E.g. two finger interactions on the external display zone 31 may be used to transform the external display zone 31 within display 4, while other interactions are passed on to the external device 3. Touch gestures may also be transcoded to other interactions, e.g. a swipe motion could be transmitted as a scroll interaction to external device 3. The above processing and filtering methods may be applied to any processing step for touch data described in this description.

In one example, first video data 71 is a video data output from external device 3. First processed video data 72 may be video data that has been filtered and or processed by interaction interface device 100. First output video data 73 may be video data that has been filtered and or processed by interaction computer 20. In some examples, processing may comprise transcoding between the different protocols involved (e.g. convert from HDMI to USB UVC). In some examples, processing may comprise 2D transformations of video related to the positioning, scaling and rotation of the external display zone 31 relative to the external display output 30, to ensure that video data received from external device 3 is displayed proportionally according to the dimensions and rotation of external display zone 31. The above processing and filtering methods may be applied to any processing step for video data described in this description.

In one example, touch interactions received on the touch surface of touch display unit 2 may be handled as input for whiteboard application 35 running on interaction computer 20 or may be transmitted as the processed first touch data 62 to the external device 3 via interaction interface device 100.

In one example, touch interactions occurring within external display zone 31 of display 4 may be transmitted as the first touch data 61 to the interaction interface device 100, while touch interactions occurring outside of external display zone 31 of display 4 may be processed as direct user interaction with the graphics user interface of whiteboard application 35. In this example, touch interactions occurring within external display zone 31 and transmitted as the first touch data 61 may be passed to external device 3 for processing as user input direct to external device 3. e.g. Manipulation of a software application running on external device 3. Touch interactions occurring outside of external display zone 31 may be processed as direct user interaction with the graphics user interface of whiteboard application 35 and the corresponding interaction displayed on display 4 (e.g. pen input). In this example, by using the interaction interface device 100, a user can interact with both the touch display unit 2 and with the external device 3 via the touch display unit 2. For example, when showing a presentation from external device 3 on the touch display unit 2, the user can interact anywhere on the touch display unit 2, including within the external display zone 31. In one example, this allows the user to interact directly with a whiteboard application 35 running on touch display unit 2 by interacting with the display 4 outside of the external display zone 31. The user can then also interact with external device 3 by interacting with the display 4 within external display zone 31.

Therefore, the interaction interface device 100 allows for the touch display unit 2 to be fully utilized when running presentations and the user can interact with applications running on touch display unit 2 as well as directly with the presentation from the external device 3.

In one example of the above configuration, if the external device 3 is a laptop, the user connects the laptop via the interaction interface device 100 to the touch display unit 2 and projects the external display output 30 on the touch display unit 2. The user can start drawing or commenting on applications running on both the touch display unit 2 and on the laptop by use of touch interactions with the touch display unit 2. In the present description, it is understood that the external display output 30 may match the image displayed on a display of the laptop. Alternatively, external display output 30 may be an independent video output by the laptop not matched to the display of the laptop. e.g. external display output 30 may display a presentation whilst the laptop display is used to show presentation controls and a next slide preview.

Figure 1B:
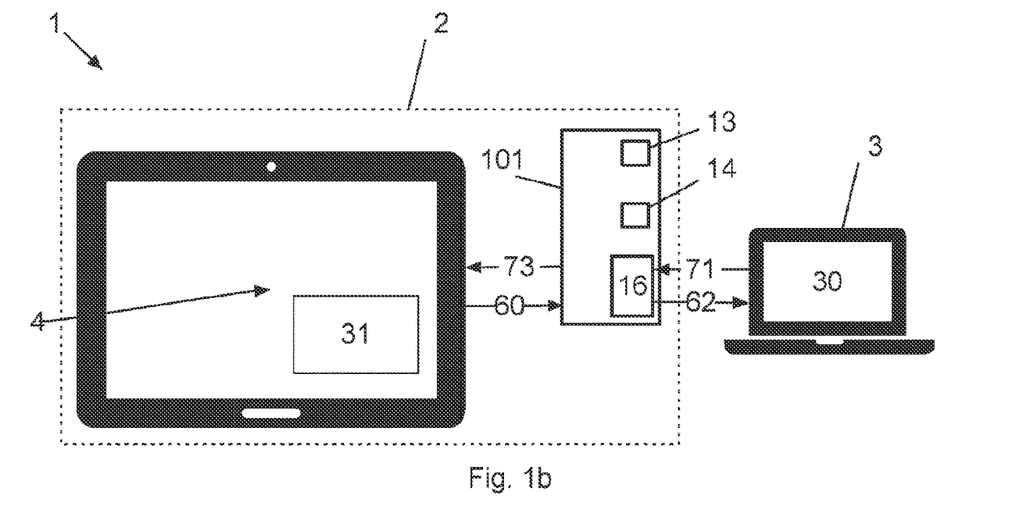
FIG. 1b is a schematic illustration of an alternative interaction interface device for a touch display unit.

FIG. 1*b* is an alternative configuration of an interaction system 100 to that of FIG. 1*a*, comprising an integrated interaction interface device 101 for providing an interface between a touch display unit 2 and an external device 3. In this example, integrated interaction interface device 101 is integrated with the touch display unit 2. The integrated interaction interface device 101 comprises an interface processor 13, an interface memory 14. Integrated interaction interface device 101 is configured to execute a software stored in interface memory 14 and display an output to display 4 as first output video data 73. First output video data 73 may be processed by interaction interface device 101 according to any of the processing techniques described for FIG. 1*a*. Integrated interaction interface device 101 is further configured to receive touch coordinate data 60 from display 4 wherein touch coordinate data 60 corresponds to touch interactions occurring on the touch surface of display 4. In one embodiment, the software running on interface processor 13 is a whiteboard application 35 configured to receive and process touch coordinate data 60 to display a corresponding user interaction within a graphics user interface of the whiteboard application on display 4. The whiteboard application 35 may further comprise external display zone 31 within the graphics user interface, the external display zone 31 shown on at least a sub portion of display 4. In one embodiment, interface processor 13 comprises a video processor unit such as a scaler, FPGA and/or a graphics processor unit for processing at least the first video data 71. In one embodiment, integrated interaction interface device 101 comprises a touch processing unit, such as a touch sensor controller board. The touch processing unit may be integrated in interface processor 13.

The integrated interaction interface device 101 further comprises a second interface 16 between the integrated interaction interface device 101 and the external device 3. The second interface 16 is configured to receive the first video data 71 from the external device 3 and transmit the processed first touch data 62 to the external device 3. Processed first touch data 62 may be processed by interaction interface device 101 in the same manner as described in FIG. 1a.

In one example, touch interactions received on the touch surface of touch display unit 2 may be handled as input for whiteboard application 35 running on interaction interface device 100 or may be transmitted as the processed first touch data 62 to the external device 3 via second interface 16.

In one example, touch interactions occurring within external display zone 31 of display 4 may be transmitted as the processed first touch data 62 to the to the external device 3 via second interface 16, while touch interactions occurring outside of external display zone 31 of display 4 may be processed as direct user interaction with the graphics user interface of whiteboard application 35. In this example, touch interactions occurring within external display zone 31 and transmitted as the processed first touch data 62 may be passed to external device 3 for processing as user input direct to external device 3. e.g. Manipulation of a software application running on external device 3. Touch interactions occurring outside of external display zone 31 may be processed as direct user interaction with the graphics user interface of whiteboard application 35 and the corresponding interaction displayed on display 4 (e.g. pen input).

As with the example above, by providing touch display unit 2 with an integrated interaction interface device 101, a user can interact with both the touch display unit 2 and with the external device 3 via the touch display unit 2. For example, when showing a presentation from external device 3 on the touch display unit 2, the user can interact anywhere on the touch display unit 2, including within the external display zone 31. In one example, this allows the user to interact directly with a whiteboard application 35 running on touch display unit 2 by interacting with the display 4 outside of the external display zone 31. The user can then also interact with external device 3 by interacting with the display 4 within external display zone 31.

Figure 2:
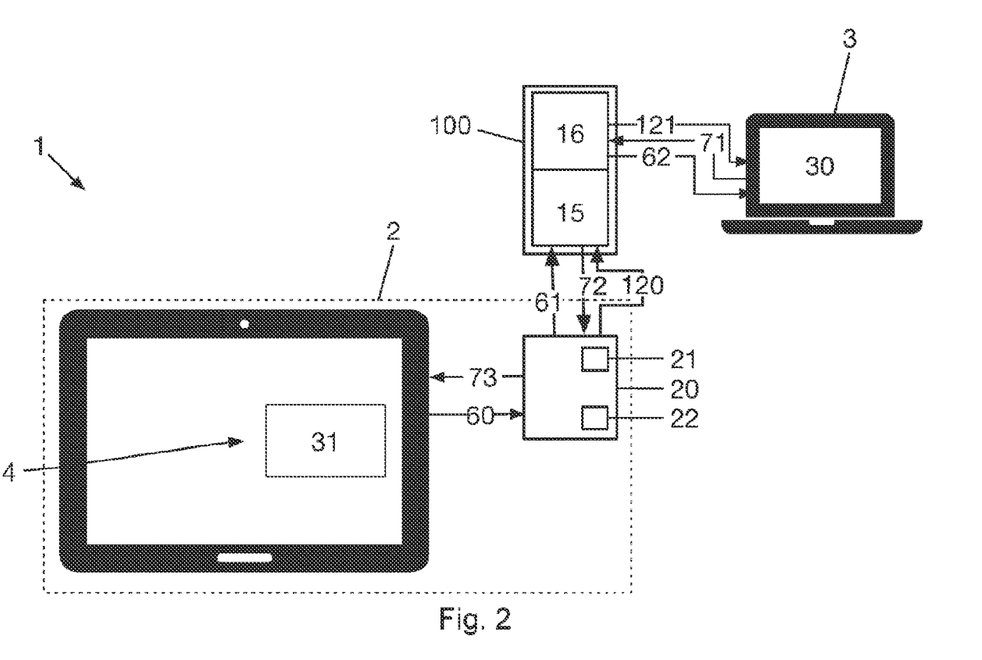
FIG. 2 is a schematic illustration of an interaction interface device comprising a second video data.

Illustrated in FIG. 2 is an example wherein the first interface 15 is further configured to receive a second video data 120 from the integrated interaction interface device 101. The second video data 120 may correspond to an image displayed on display 4 of touch display unit 2, and the second interface 16 is configured to transmit the second video data 120 to the external device 3. The second video data 120 allows for applications and interactions shown on touch display unit 2 to be transmitted back to external device 3. In one example, the entire output of display 4 of touch display unit 2 is transmitted to external device 3 via interaction interface device 100. In another example, the output of display 4 of touch display unit 2, excluding external display zone 31, is transmitted to external device 3 via interaction interface device 100. In this example, a reduced bandwidth is used as compared with transmitting the entire display area.

In an example, an application shown on display 4 is a whiteboard application 35. The user may draw, annotate, write or otherwise interact with the whiteboard application 35 through the touch surface of touch display unit 2, as well as interacting with the external device 3 via external display zone 31. In some examples, the user may take snapshots of external display zone 31 and display them using whiteboard application 35 outside of external display zone 31.

In one example, the interaction interface device 100 is arranged to allow remote video conferencing, via a video conferencing system 45, between users and/or viewers of the touch display unit 2 and a set of one or more remote viewers 41. In an example of an arrangement for video conferencing, touch display unit 2 is connected to external device 3 via interaction interface device 100 as shown in FIG. 1. In this example and other examples below relating to video conferencing, external device 3 is also connected to a network and is configured to send a video data to one or more remote viewers 41 via the network. In this example, the video data sent to one or more remote viewers 41 corresponds to the external display output 30 of external device 3. In this way, remote viewers 41 can view the output of external device 3 while local users 40 viewing touch display unit 2 can view the output of external device 3 within external display zone 31 while also interacting with touch display unit 2. Where the output of external device 3 also includes a video of the remote viewers 41, this can be seen by the local users 40 within external display zone 31.

In another example of an arrangement for video conferencing, touch display unit 2 is connected to external device 3 via interaction interface device 100 as shown in FIG. 2. In this example, the video data sent to one or more remote viewers 41 via the network corresponds to the second video data 120. In this way, remote viewers 41 can view the applications shown on the display of touch display unit 2 as well as the output of external device 3 (i.e. external display output 30). local users 40 viewing touch display unit 2 can also view the output of external device 3 while also viewing and interacting with the applications shown on the display of touch display unit 2.

Although an interaction interface device 100 equivalent to FIG. 1a is shown in FIG. 2, it is understood that an equivalent functionality is possible using the integrated configuration of FIG. 1b. In such an integrated configuration, the functionality of the interaction interface device 100 and the interaction computer 20 are merged, as per FIG. 1b.

Figure 3:
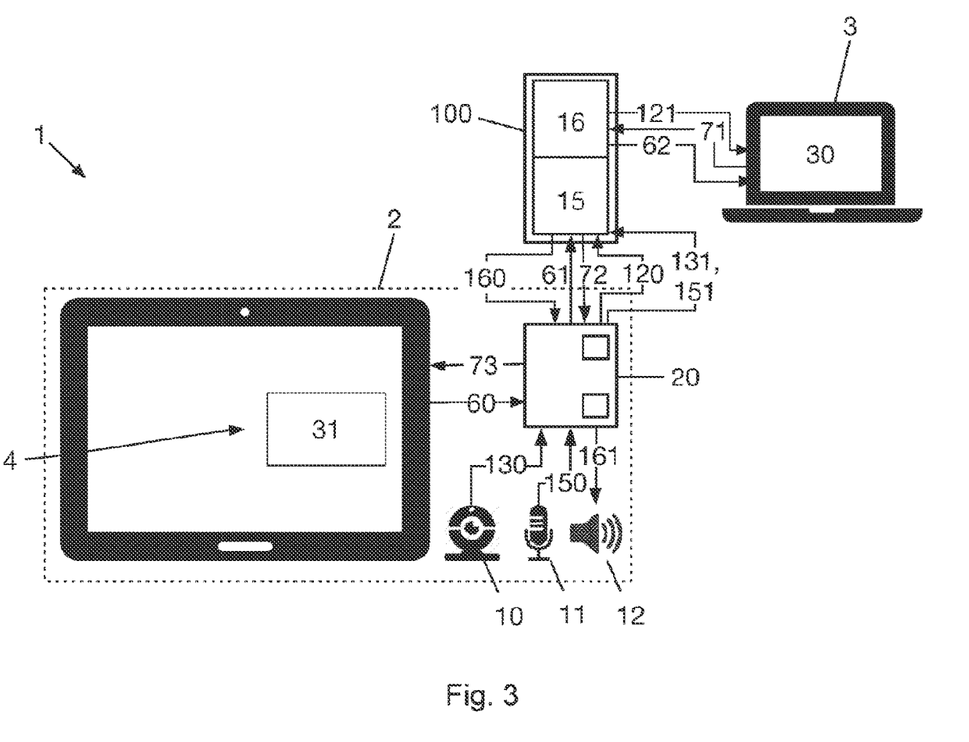
FIG. 3 is a schematic illustration of an interaction interface device comprising a touch display unit camera, a microphone and a speaker.

Illustrated in FIG. 3 are examples of the first interface 15 further being configured to receive a video data generated by a touch display unit camera 10. In this example, interaction computer 20 is configured to receive third video data 130 from touch display unit camera 10, optionally filter and/or process the third video data 130 and send the video data to interaction interface device 100 as processed third video data 131. The second interface 16 of interaction interface device 100 is configured to transmit the processed third video data 131 to the external device 3. Third video data 130 and/or processed third video data 131 may be integrated into second video data 120/processed second video data 121 or may be transmitted on an independent channel between interaction interface device 100 and external device 3.

Also illustrated in FIG. 3 are examples of the first interface 15 further being configured to receive an audio data generated by a touch display unit microphone 11. In this example, interaction computer 20 is configured to receive first audio data 150 from touch display unit microphone 11, optionally filter and/or process the first audio data 150, and send the audio data to interaction interface device 100 as processed first audio data 151. The second interface 16 of interaction interface device 100 is configured to transmit the processed first audio data 151 to the external device 3. First audio data 150 and/or processed first audio data 151 may be integrated into first touch data 61/processed first touch data 62 or may be transmitted on an independent channel between interaction interface device 100 and external device 3.

The second interface 16 may be configured to receive a second audio data 160 from the external device 3. The first interface 15 is further configured to transmit the second audio data 160 for output on a touch display unit speaker 12. Second audio data 160 may be integrated into first video data 71 or may be transmitted on an independent channel between external device 3 and interaction interface device 100.

Figure 4:
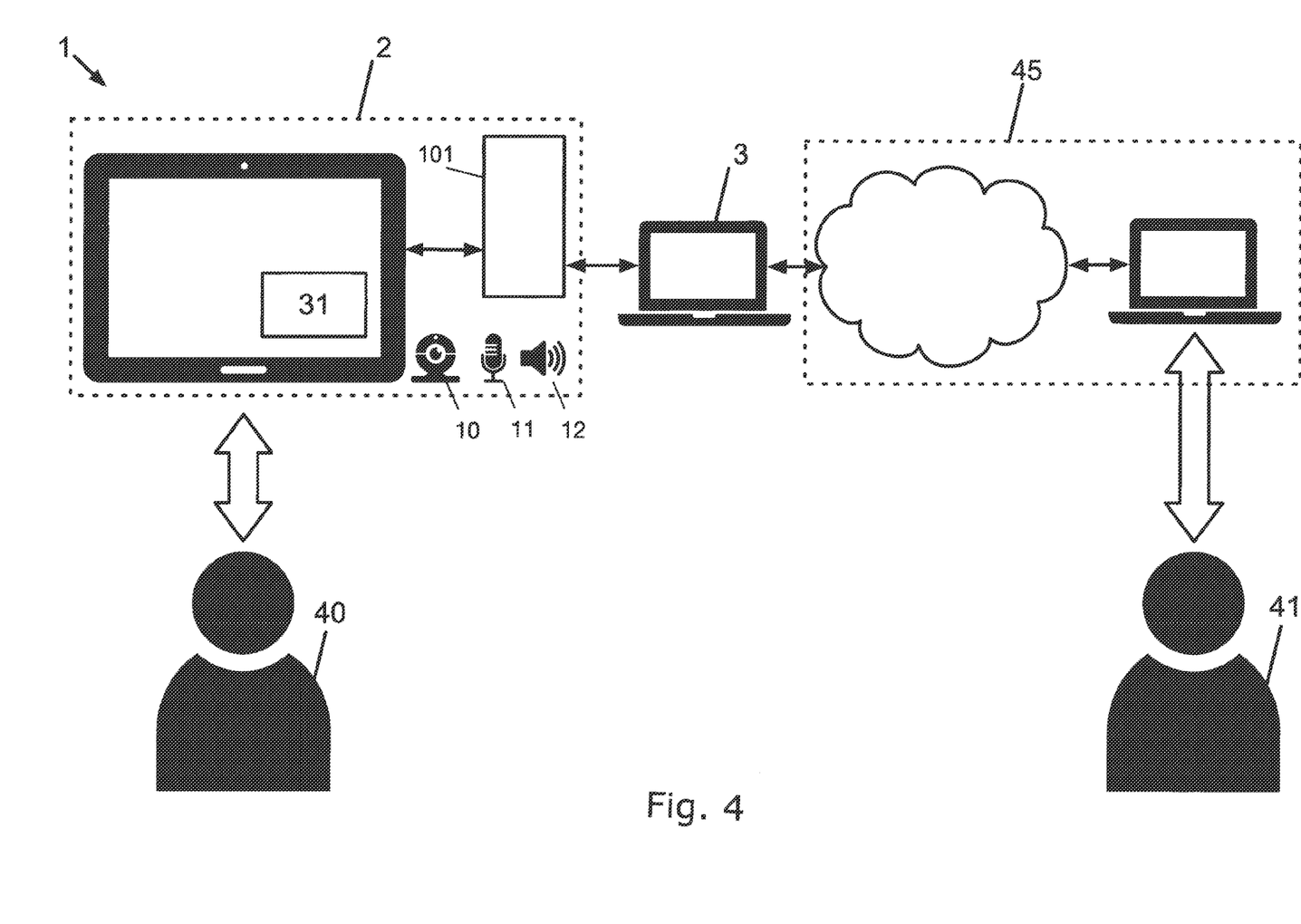
FIG. 4 is a schematic illustration of an interaction interface device comprising a processing unit.

In one example, illustrated in FIG. 4, local users 40 interact with the touch display unit 2, running whiteboard application 35, via the touch surface. At the same time, local users 40 are recorded by touch display unit camera 10 and touch display unit microphone 11. The output from the whiteboard application 35, the interactions with the touch display unit 2, the touch display unit camera data and the touch display unit microphone data are sent to external device 3, either separately or at least partially integrated. External device 3 then processes the received data and processes the data to generate a video and audio data suitable for sending over a video conferencing system 45 to remote viewers 41. The touch display unit camera 10, touch display unit microphone 11 and/or touch display unit speaker 12 may be integrated with the touch display unit 2. Alternatively, the touch display unit camera 10, touch display unit microphone 11 and/or touch display unit speaker 12 may be different components from the touch display unit 2.

Figure 5:
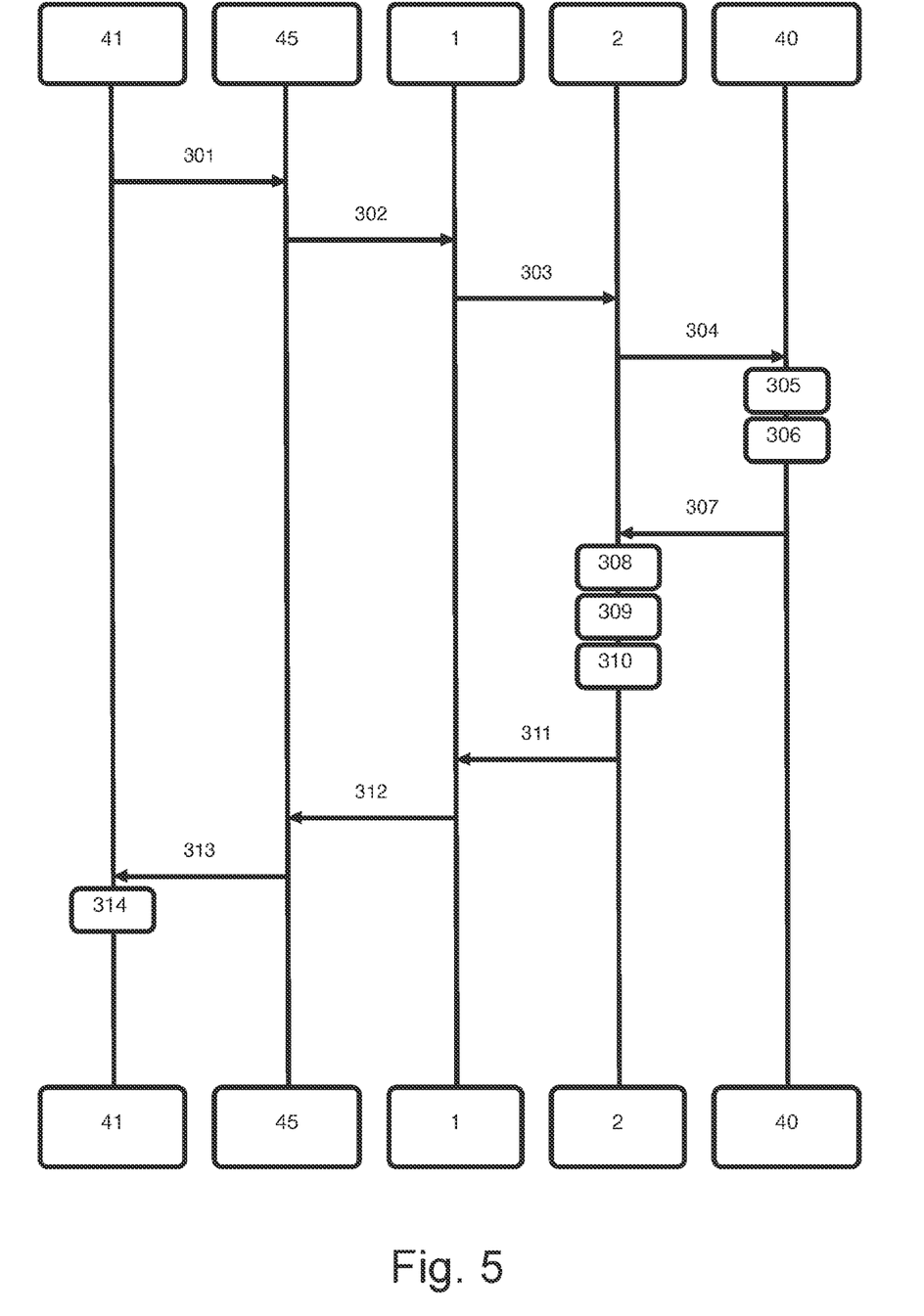
FIG. 5 is a sequence diagram showing an example of the flow of audio, video, and touch data between nodes on a video conferencing system according to an example of the present disclosure.

FIG. 5 shows a sequence diagram showing an example of the flow of audio, video, and touch data between nodes on a video conferencing system 45 according to an integrated (e.g. FIG. 1b) example of the present disclosure.

In step 301, remote viewers 41 are recorded and the corresponding video and audio of remote viewers 41 is sent to video conferencing system 45. Video conferencing system 45 may, for example, comprise an application running on a remote viewer's laptop, connected via the internet to a corresponding application running on external device 3. external device 3

In step 302, video conferencing system 45 transmits the video and audio of remote viewers 41 to external device 3 via a network.

In step 303, external device 3 may process the video and audio of remote viewers 41 and passes it to touch display unit 2.

In step 304, the video of remote viewers 41 may be displayed on at least a portion of display 4 (e.g., a window 31 of whiteboard application 35), and the audio may be output on a speaker of touch display unit 2.

In step 305, the local user 40 sees remote viewers 41 on display 4 and hears the remote viewers 41.

In step 306, the local user 40 interacts with the whiteboard application 35 running on touch display unit 2.

In step 307, touch display unit 2 detects the interaction from local user 40 with display 4 and outputs touch co-ordinates.

In step 308, touch display unit 2 updates whiteboard app 35 with the local user 40 touch interaction.

In step 309, local user 40 is recorded by touch display unit 2.

In step 310, touch display unit 2 generates a whiteboard application video data, touch co-ordinates, local user 40 video, and local user 40 audio data, either in an integrated format or as independent data streams.

In step 311, touch display unit 2 sends the whiteboard application video data, touch co-ordinates, local user 40 video, and local user 40 audio data to external device 3.

In step 312, external device 3 sends the whiteboard application video data, local user 40 video, and local user 40 audio data to video conferencing system 45 either in an integrated format or as independent data streams.

In step 313, video conferencing system 45 displays the whiteboard application 35 and local user 40 video to the remote viewers 41 and plays the local user 40 audio data to remote viewers 41.

In step 314, remote viewers 41 see and hear local user 40 as well as see the interaction between local user 40 and the whiteboard application 35.

Figure 6:
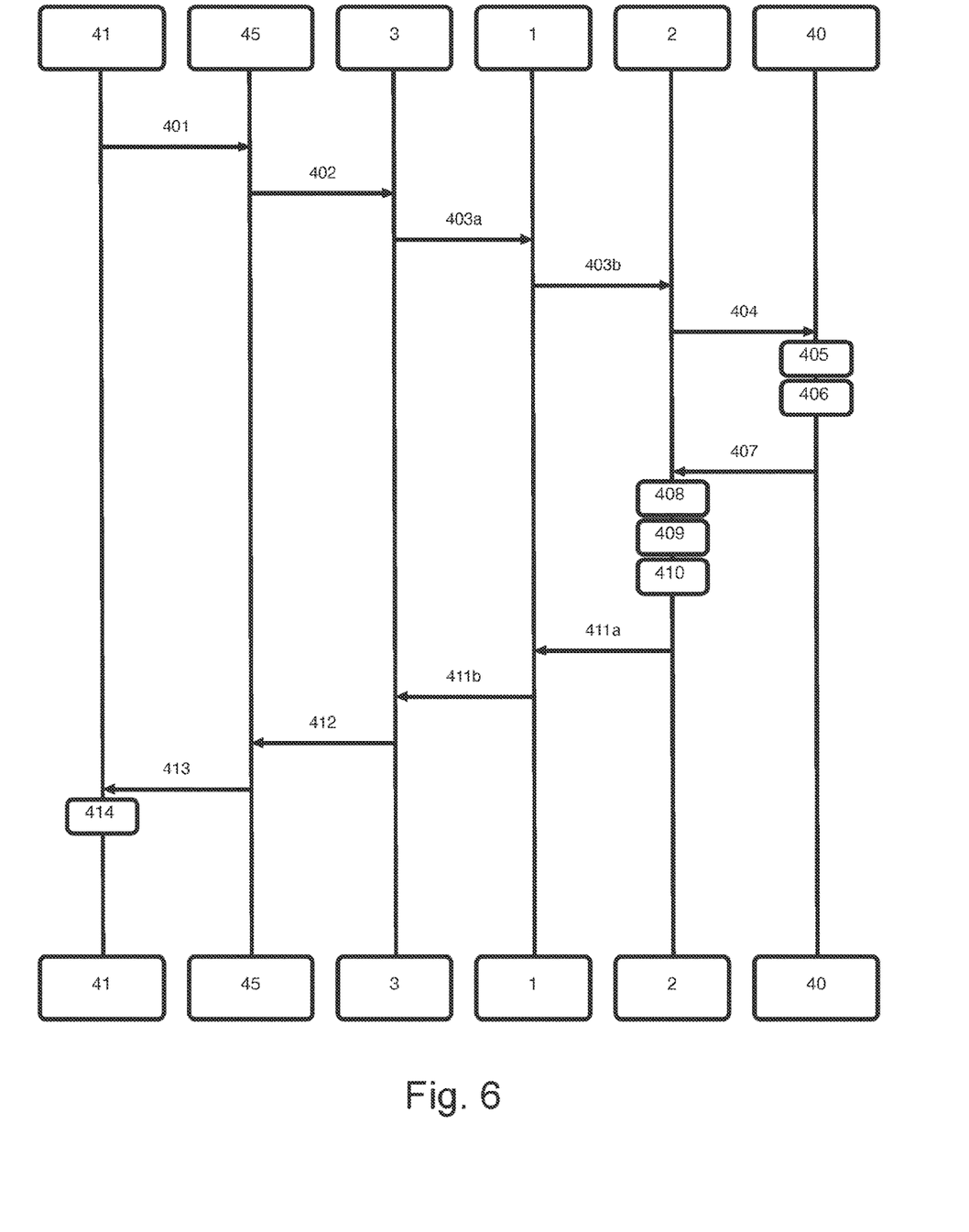
FIG. 6 is another sequence diagram showing an example of the flow of audio, video, and touch data between nodes on a video conferencing system according to an example of the present disclosure.

FIG. 6 shows another more detailed sequence diagram showing an example of the flow of audio, video, and touch data between nodes on a video conferencing system 45 according to the example shown in FIG. 3.

In step 401, remote viewers 41 are recorded and the corresponding video and audio of remote viewers 41 is sent to video conferencing system 45. Video conferencing system 45 may, for example, comprise an application running on a remote viewer's laptop, connected via the internet to a corresponding application running on external device 3. external device 3

In step 402, video conferencing system 45 transmits the video and audio of remote viewers 41 to external device 3 via a network.

In step 403a, external device 3 processes the video and audio of remote viewers 41 and generates first video data 71 and second audio data 160 in dependence on the video and audio of remote viewers 41. External device 3 then transmits the first video data 71 and second audio data 160 to second interface 16 of interaction interface device 100.

In step 403b, interaction interface device 100 may process and/or filter the first video data 71 and second audio data 160 before transmitting the corresponding first processed video data 72 and second audio data 160 to interaction computer 20 of touch display unit 2.

In step 404, the interaction computer 20 may process and/or filter the first video data 71 and second audio data 160 before display the corresponding first output video data 73 on at least a portion of display 4 (e.g. a window or external display zone 31 of whiteboard application 35), and outputting processed second audio data 161 on a speaker of touch display unit 2.

In step 405, the local user 40 sees remote viewers 41 on display 4 and hears the remote viewers.

In step 406, the local user 40 interacts with the whiteboard application running on touch display unit 2.

In step 407, touch display unit 2 detects the local user interaction with display 4 and outputs touch coordinate data 60.

In step 408, touch display unit 2 either updates whiteboard application 35 in dependence on touch coordinate data 60 or generates outputs first touch data 61.

In step 409, local user 40 is recorded by touch display unit 2 to generate third video data 130 and first audio data 150.

In step 410, interaction computer 20 generates a second video data 120 corresponding to whiteboard application video data, first touch data 61, third video data 130 and first audio data 150. Interaction computer 20 may optionally integrate v and third video data 130 together. In one example integration, third video data 130 is overlaid on second video data 120 to show the local user in a window of whiteboard application 35.

In step 411a, interaction computer 20 sends the second video data 120, third video data 130, first audio data 150, and first touch data 61 to interaction interface device 100 via first interface 15.

In step 411b, interaction interface device 100 may optionally process and or filter the received data to generate processed second video data 121, processed third video data 131, processed first audio data 151, and processed first touch data 62. The unprocessed or processed data is then sent to external device via interface 16.

In step 412, external device 3 processes the received touch data to perform an interaction on external device 3 where relevant. External device 3 also processes the received video and audio data and sends a corresponding video and audio data to video conferencing system 45.

In step 413, video conferencing system 45 displays the whiteboard application 35 and local user 40 video to the remote viewers 41 and plays the local user 40 audio data to remote viewers 41.

In step 414, remote viewers 41 see and hear local user 40 as well as see the interaction between local user 40 and the whiteboard application 35.

In the above examples, the interaction processor 21 and/or interface processor 13 can be a processor or a logic controller or the like which can process video, data and/or audio. In one example, interaction processor 21 and/or interface processor 13 is a RK3399 chip.

In some examples, the interaction processor 21 and/or interface processor 13 comprises a video processor unit such as a scaler, a processor, a FPGA and/or a graphics processor unit for processing at least the first video data 71. The video processor unit may for example be configured to scale the resolution up or down and/or transform the first video data 71. In some examples is the interaction processor 21 and/or interface processor 13 and the video processor unit are different components.

The interaction interface device 100 may also comprise a touch converter configured to convert the first touch data 61 into a universal serial bus human interface device class (USB HID) format. By using the touch converter e.g., a proprietary touch format can be used with the touch display unit 2 and converted into USB HID which can be used with the external device 3.

The first interface 15 and/or second interface 16 may comprise a universal serial bus (USB) and/or be based in the universal serial bus protocol. The universal serial bus may be of any of a type USB2-USB4. In some examples, the USB is USB3 and can thus at least both handle the first video data 71 and the first touch data 61.

The first interface 15 and/or second interface 16 may comprise a High-Definition Multimedia Interface (HDMI), Display port and/or be based on a High-Definition Multimedia Interface protocol. By using USB and/or HDMI, an easy connection between the touch display unit 2, the external device 3 and the interaction interface device 100 can be accomplished. It would also be possible to mix the two by e.g. handling the first touch data 61 by using USB and the first video data 71 by using HDMI.

In an example, the user connects a first USB-C cable between the external device 3 and the interaction interface device 100 and a second USB-C cable between the interaction interface device 100 and touch display unit 2. Upon connection, the external device 3 enumerates five devices from the interaction interface device 100:

A display device capable of receiving the first video data 71 from external device 3.

A USB HID multi-touch and/or digitizer device for outputting the processed first touch data 62 to external device 3.

A USB Video Capture Device for outputting the third video data 130 to external device 3.

A USB Audio Capture Device for outputting the first audio data 150 to external device 3

A USB Audio Device capable of receiving the second audio data 160 from external device 3.

The external device 3 is then ready and may be used for handing the different input and outputs through the interaction interface device 100 for e.g. remote web conferencing.

In some examples, the first interface 15 and/or the second interface 16 comprises a wireless transmitter/receiver and/or are based on a wireless protocol. The first interface 15 and/or the second interface 16 may be chosen based on a total or partial bandwidth need for handling the video, audio and/or data at the respective first interface 15 and/or the second interface 16.

From the description above follows that, although various examples of the invention have been described and shown, the invention is not restricted thereto, but may also be embodied in other ways within the scope of the subject-matter defined in the following claims.

The invention claimed is:

1. An interaction interface device configured to provide an interface between a touch display unit and an external device, the touch display unit comprising a display having a touch surface, the interaction interface device comprising;
   a first interface between the interaction interface device and the touch display unit, the first interface being configured to:
      receive a first touch data from the touch display unit, wherein the first touch data corresponds to touch interactions occurring within a sub-portion of the display, and
      transmit a first video data to the touch display unit for display on the sub-portion of the display, and
   a second interface between the interaction interface device and the external device, the second interface being configured to:
      receive the first video data from an external device, and
      transmit the first touch data to the external device,
   wherein the first interface is further configured to receive a second video data from the touch display unit, the second video data corresponding to an image on the display, and
   wherein the second interface is further configured to transmit the second video data to the external device.

2. An interaction interface device according to claim 1, wherein the first interface is further configured to receive a third video data generated by a touch display unit camera, and
   wherein the second interface is configured to transmit the third video data to the external device.

3. An interaction interface device according to claim 1, wherein the first interface is further configured to receive a first audio data generated by a touch display unit microphone, and
   wherein the second interface is configured to transmit the first audio data to the external device.

4. An interaction interface device according to claim 1, wherein the second interface is configured to receive a second audio data from the external device, and
   wherein the first interface being further configured to transmit the second audio data to the touch display unit for output on a touch display unit speaker.

5. An interaction interface device according to claim 1, further comprising an interface processor for processing at least the first video data and/or the first touch data.

6. An interaction interface device according to claim 1, comprising a touch converter configured to convert the first touch data to universal serial bus human interface device class format.

7. An interaction interface device according to claim 1, wherein the first interface and/or second interface comprises a universal serial bus.

8. An interaction interface device according to claim 7, wherein the first interface and/or second interface comprises a high definition multimedia interface.

9. An interaction system comprising,
a touch display unit, the touch display unit comprising a display unit having a touch surface,
an external device, and
an interaction interface device comprising:
a first interface between the interaction interface device and the touch display unit, the first interface being configured to:
receive a first touch data from the touch display unit, wherein the first touch data corresponds to touch interactions occurring within a sub-portion of the display, and
transmit a first video data to the touch display unit for display on the sub-portion of the display, and
a second interface between the interaction interface device and an external device, the second interface being configured to:
receive the first video data from the external device, and
transmit the first touch data to the external device,
wherein the first interface being further configured to receive a second video data from the touch display unit, the second video data corresponding to an image displayed on the display, and
wherein the second interface being configured to transmit the second video to the external device.

10. An interaction system according to claim 9, further comprising a touch display unit camera, a touch display unit microphone and/or a touch display unit speaker.

11. An interaction system according to claim 9, wherein the interaction interface device further comprising an interface processor for processing at least the first video data and/or the first touch data.

12. A method for providing an interface between a touch display unit and an external device, the touch display unit comprising a display having a touch surface, comprising;
receiving via a first interface of an interaction interface device, a first touch data from the touch display unit, wherein the first touch data corresponds to touch interactions occurring within a sub-portion of the display,
transmitting via the first interface a first video data to the touch display unit for display on the sub-portion of the display,
receiving, via the first interface, a second video data form the touch display unit, the second video data corresponding to an image displayed on the display,
receiving via a second interface of the interaction interface device, the first video data from an external device, and
transmitting the first touch data and the second video data to the external device.

* * * * *